UNITED STATES PATENT OFFICE.

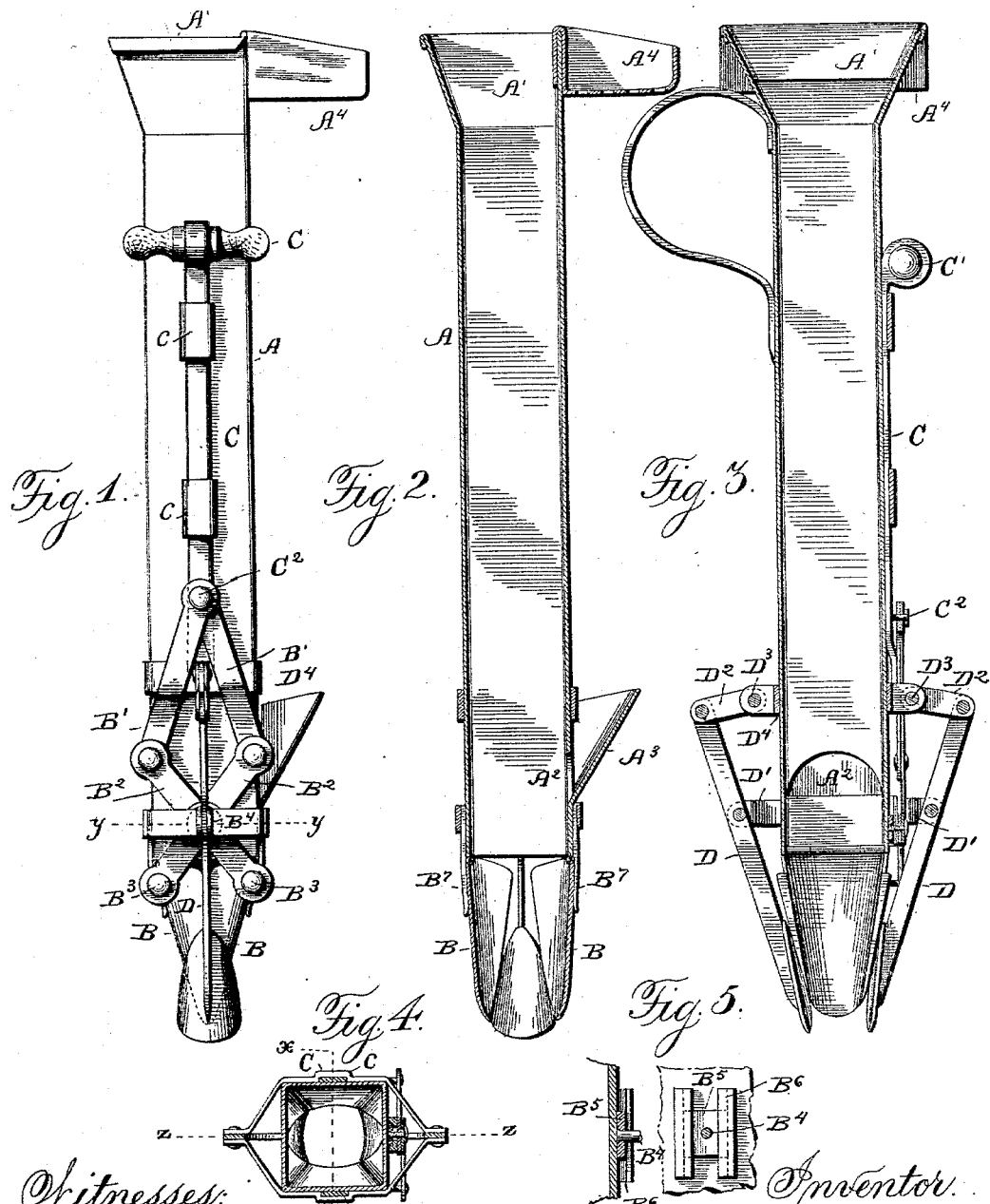

JOHN WALTER, OF WINTER HAVEN, FLORIDA.

TRANSPLANTER.

SPECIFICATION forming part of Letters Patent No. 551,421, dated December 17, 1895.

Application filed July 9, 1895. Serial No. 555,411. (No model.)

*To all whom it may concern:*

Be it known that I, JOHN WALTER, a citizen of the United States, residing at Winter Haven, in the county of Polk and State of Florida, have invented certain new and useful Improvements in Transplanters; and I do hereby declare the following to be a full, clear, and exact description of the invention, such as will enable others skilled in the art to which it appertains to make and use the same.

My invention relates to improvements in transplanting devices, and particularly to improvements in that class thereof in which spoon-shaped jaws are used to hold the plant being transplanted, and independent dirt-packing arms are used to force the dirt around the roots of the plant; and it consists in the improved transplanting device whose construction and arrangement of parts will be hereinafter fully described and particularly pointed out in the claims.

In the transplanting of plants care must be taken not only to provide a suitable hole in the earth in which to deposit the plant being set, and to force the dirt around the roots of the plant as the transplanting device is being withdrawn, it being unsafe to rely upon the dirt falling around the roots of the plant without the use of an additional dirt-packing means, but to provide suitable means for holding the plant in the transplanter so that the earth will not be shaken away from the roots thereof. It is further advisable to provide means connected with the transplanting device for watering the roots of the plant while it is being set. The success of operation depends upon the successful carrying out of all of these details, and not one should be overlooked if success is to be secured.

Heretofore transplanting devices have been used in which the plants being transplanted have been held between two spoon-shaped jaws and the dirt has been packed around the roots of the plant as the transplanting device was being withdrawn by auxiliary dirt-packing arms coacting with the spoon-shaped jaws; but in by far the greater number of such devices the means provided to hold the plant during the transplanting operation have been insufficient, and proper attention has not been paid to the watering of the roots of the plant while it was being set.

The object of my present invention is to avoid these defects of the former constructions, and to provide a transplanting device in which means will be provided for properly holding the plants in the transplanter itself so that the earth around the roots of the plants will not be allowed to be shaken therefrom while the plant is being set.

In accomplishing the object of my invention, I make the body of the transplanting device tubular, and pivot to the lower end thereof a pair of spoon-shaped jaws, which, when closed, afford a closure to the open end of the tubular body, but which, when open, afford an opening of sufficient size to permit the discharge of the plant which has been placed in the body of the device. The spoon-shaped jaws are opened and closed by a rod which is supported in suitable guideways on one side of the tubular body, and is reciprocated by a handle attached to the edge thereof, a triangular system of leverage connecting the jaws to the bar. Auxiliary dirt-packing arms are also pivoted to the sides of the tubular body and operated through suitable intermediate mechanism by the reciprocating bar, the arms being set at right angles to the spoon-shaped jaws, so as to close the opening caused between the sides of the jaws when the same are opened, and thus pack the dirt around the roots of the plant. The relative movements of the spoon-shaped jaws and the dirt-packing arms are so arranged that when the jaws open the arms are closed. The spoon-shaped jaws are normally open while the opposite arms are normally closed. The operation, as specified, can thus take place.

The plants to be transplanted are held until ready for setting in a basket removably attached to the top of the transplanting device. As rapidly as it is desired to set or plant the same, the operating lever or rod is drawn upward, so as to close the spoon-shaped jaws and open the dirt-packing arms, and the plants are placed in the tubular body of the device and fall to the bottom thereof. The spoon-shaped jaws are now pushed into the earth until they reach the desired depth, (the dirt will now hold the jaws closed independent of the actuation of the operating lever or rod,) a slight downward movement given to the operating-rod to loosen the earth around the jaws, and the device withdrawn from the soil, the dirt-packing arms serving to press the dirt in around the roots of the plant. With the aid of the start given by the slight downward movement imparted to the operating-rod, a spring, which is attached to the body of the device and to the spoon-shaped jaws, will complete the downward movement of such rod automatically, thus enabling the setting of the plant to be accomplished very easily.

Means are provided for enabling the roots of the plant to be watered while it is being set by forming an opening in one side of the tubular body and attaching to the outer surface of the device a spout which will convey water through the opening to the plant while it is held in the tubular body of the transplanting device.

My invention is fully illustrated in the drawings, which accompany and form a part of this application, in which the same reference-letters refer to the same or corresponding parts, and in which—

Figure 1 is a side view of my transplanting device, showing the spoon-shaped jaws closed and the dirt-packing arms open. Fig. 2 is a central section, taken on the line X X, Fig. 4, showing especially the opening in the side of the tubular body through which water is admitted to the same. Fig. 3 is a section of Fig. 4, taken on the line Z Z, showing the parts in the position they assume when the plant has just been set. Fig. 4 is a section of Fig. 1, taken on the line Y Y. Fig. 5 is a detail view showing the slot connection to the tubular body of the lever system which operates the pivoted jaws.

Referring to the drawings, A represents the body of the transplanter device. It is tubular, as shown, and is preferably square in cross-section in order that the pivots which connect the spoon-shaped jaws B to the bottom thereof may be strong enough to resist the strain to which they are subjected in the operation of the device. The spoon-shaped jaws B, when closed, afford a complete closure at the open mouth of the tubular body, and thus hold therein the plants which are taken from the basket $A^4$, removably attached to the top of the tubular body, and placed in the flaring mouth $A'$ of the same. The shape of the jaws is also such as to permit them to be readily inserted in the ground to the desired depth, so that the setting of the plants can be quickly and efficiently effected.

The jaws are operated in the following manner: To one side of the tubular body A is held, by suitable guide-plates $c$, the reciprocating bar C, which is provided with a handle $C'$ at its upper end to enable it to be conveniently operated. Near the lower end of this bar is formed a pin $C^2$, upon which are held the apertured ends of the lever-arms $B'$, the said arms being connected at their other ends to lever-arms $B^2$. The lower ends of the lever-arms $B^2$ are fastened to pins $B^3$ projecting from the side of the spoon-shaped jaws B. The lever-arms $B^2$ are crossed so as to afford a triangular leverage, as shown, and are mounted upon the pin $B^4$, which is integral with the sliding block $B^5$, this block moving between the guideways $B^6$. It is necessary to provide for this movement of the pin $B^4$, as it must move up and down as the spoon-shaped jaws are actuated.

The construction thus described is complete, and permits a free up-and-down movement of the bar C, and the opening and closing of the jaws B thereto. The springs $B^7$, which may be flat, as shown, or of any other suitable character, normally hold the jaws B open.

In some soil the earth will fall around the roots of the plant set by the transplanter of the character described without the use of any additional means, but this would only happen with certain soils and in certain conditions thereof. It becomes necessary, therefore, to provide means for forcing the soil around the roots of the plant between the opening formed by the sides of the spoon-shaped jaws when the same are opened. This I accomplish by the use of the dirt-packing arms D, which are pivoted to the bracket $D'$, secured to the body of the transplanting device, and are connected at their upper ends by the links $D^2$ to the arms $D^3$ of the collar $D^4$. This collar surrounds the tubular body of the transplanting device and has a free movement thereupon. It is connected to the lower end $C^3$ of the rod C, so that it is moved up and down with the reciprocation of the same. The dirt-packing arms are also connected with the collar in such a manner that they are closed when the device is not in use, but when the spoon-shaped jaws are closed preparatory to setting a plant are opened so as to be perpendicular in position, so that they will readily enter the ground. The parts thus coact with each other to enable a complete setting of the plant to be attained.

On one side of the tubular body I form an opening $A^2$, in connection with which is the spout $A^3$, so that water, or other fluid, can be poured around the roots of a plant while it is being set.

The operation of my invention is as follows: The plants to be set are in the first instance held in the basket $A^4$ (formed with a perforated bottom as shown) at the top of the device. When a plant is to be set in the ground the spoon-shaped jaws are closed by drawing upward the operating-rod C, and the plant is placed in the tubular body A, and at once falls to the bottom thereof, the spoon-shaped jaws B preventing its escape. In this operation, the loose dirt, which surrounds the roots of the plant, is not shaken therefrom or disturbed in any essential degree, and the plant is therefore in the best condition for setting. The spoon-shaped jaws are now inserted into the earth to the desired depth (the dirt holding the spoon-shaped jaws closed after the point of the device has entered the earth) and the lever C given a slight downward movement. This disturbs the earth surrounding the jaws and enables the springs $B^7$ to act and force open the spoon-shaped jaws, closing thereby the dirt-packing arms and causing the dirt to be packed around the roots of the plant. The plant is thus securely set. It may also be watered, while the operation is taking place, through the opening $A^2$, formed in the body A.

After the plant has been set the transplanting device may be withdrawn and the operation repeated.

If plants are to be taken out of the soil, the operation of my device is alike satisfactory, for the spoon-shaped jaws are open, the dirt-packing arms being closed, so that a square-shaped cutting-surface is thus presented, which will readily penetrate the ground and will cut the earth around the roots of the plant. The transplanting device being now inserted in the earth, as the bar C' is drawn upward the plant, with the loose dirt which surrounds the roots thereof, is held between the jaws B and is readily removed.

Having thus fully described my invention, what I claim as new, and desire to secure by Letters Patent, is—

1. In a transplanting device, the combination with the body A, and the jaws B pivoted thereto at the lower end thereof, and adapted when closed to form a complete closure for said end, of the springs $B^7$, attached to the lower end of the body A and to the pivoted jaws B for normally holding said jaws open, the lever C mounted on one side of the body A, and a lever system, composed of the crossed arms $B^2$, mounted on the sliding pivot $B^4$, and the arms B', for connecting said lever C with said jaws B, whereby said jaws can be closed by a movement of said lever, substantially as described.

2. In a transplanting device, the combination with the body A, and the jaws B pivoted thereto at the lower end thereof, and adapted when closed to form a complete closure for said end, of the springs $B^7$, attached to the lower end of the body A and to the pivoted jaws B, for normally holding said jaws open, the lever C mounted on one side of the body A, a lever system connecting said lever and said jaws, the dirt packing arms D, the collar $D^4$, the levers $D^2$ connecting the dirt packing arms and said collar, and means for connecting said collar with lever C, whereby both pivoted jaws and dirt-packing arms will be actuated by the movement of the lever C, substantially as described.

3. In a transplanting device, the combination with the body A formed with a side opening $A^2$, and the jaws B pivoted thereto at the lower end thereof, and adapted when closed to form a complete closure for said end, of the springs $B^7$, attached to the lower end of the body A and to the pivoted jaws B, for normally holding said jaws open, the lever C mounted on one side of the body A, a lever system, composed of the crossed arms $B^2$, mounted on the sliding pivot $B^4$, and the arms B' for connecting said lever C with said jaws B, whereby said jaws can be closed by a movement of said lever, the dirt packing arms D, the collar $D^4$, the levers $D^2$ connecting the dirt packing arms with said collar, and means for connecting lever C with said collar, substantially as described.

In testimony whereof I affix my signature in presence of two witnesses.

JOHN WALTER.

Witnesses:
A. WALTER,
WALTER W. CUSACK.